United States Patent
Fume

(10) Patent No.: US 12,346,363 B2
(45) Date of Patent: Jul. 1, 2025

(54) DOCUMENT CLASSIFICATION APPARATUS, METHOD, AND STORAGE MEDIUM

(71) Applicant: KABUSHIKI KAISHA TOSHIBA, Tokyo (JP)

(72) Inventor: Kosei Fume, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 18/458,277

(22) Filed: Aug. 30, 2023

(65) Prior Publication Data
US 2024/0184818 A1 Jun. 6, 2024

(30) Foreign Application Priority Data
Dec. 1, 2022 (JP) ................. 2022-193031

(51) Int. Cl.
*G06F 17/30* (2006.01)
*G06F 16/35* (2019.01)
(Continued)

(52) U.S. Cl.
CPC ............ *G06F 16/35* (2019.01); *G06F 16/383* (2019.01); *G06F 40/205* (2020.01)

(58) Field of Classification Search
CPC ........ G06F 16/13; G06F 16/24; G06F 16/156; G06F 3/1297; G06N 3/00; G06N 5/00;
(Continued)

(56) References Cited

U.S. PATENT DOCUMENTS 8,595,235 B1 * 11/2013 Sampson ................ G06F 16/35
707/758
8,724,907 B1 * 5/2014 Sampson ............ G06F 18/2433
382/209
(Continued)

FOREIGN PATENT DOCUMENTS

JP 6814091 B2 1/2021
JP 2024-41521 A 3/2024

OTHER PUBLICATIONS

Biplob Biswas et al., "TransICD: Transformer Based Code-wise Attention Model for Explainable ICD Coding," arXiv:2104.10652v1, 10 pages (2021).
(Continued)

*Primary Examiner* — Hung D Le
(74) *Attorney, Agent, or Firm* — Finnegan, Henderson, Farabow, Garrett & Dunner, LLP

(57) ABSTRACT

A document classification apparatus includes a processing circuit. The processing circuit configured to: divide a sentence included in a target document into word units; divide a sentence included in a supplementary text into word units; calculate an appearance statistic of a word obtained from the target document and the supplementary-text; provide, to the word, an attribute representing specialty, specificity, or category independence based on the appearance statistic; extract an anchor word from words included in the supplementary text based on the attribute; perform target learning in accordance with an attribute of the anchor word and generate a word embedding vector; and estimate a classification category of a document based on the word embedding vector.

10 Claims, 9 Drawing Sheets

(51) Int. Cl.
*G06F 16/383* (2019.01)
*G06F 40/205* (2020.01)

(58) Field of Classification Search
CPC ....... G05B 13/00; H03M 7/30; H04N 9/8042; G06T 9/00
See application file for complete search history.

(56) References Cited

U.S. PATENT DOCUMENTS

| | | | |
|---|---|---|---|
| 9,760,634 B1* | 9/2017 | Joshi | G06F 16/951 |
| 10,713,432 B2* | 7/2020 | Goyal | G06F 16/288 |
| 11,669,688 B1* | 6/2023 | Chartier | G06F 40/295 |
| | | | 704/9 |
| 11,669,788 B2* | 6/2023 | Balasubramanian | G06Q 10/06316 |
| | | | 705/7.15 |
| 2011/0276553 A1* | 11/2011 | Chen | G06F 16/353 |
| | | | 707/706 |
| 2014/0214835 A1* | 7/2014 | Oehrle | G06F 16/35 |
| | | | 707/737 |
| 2015/0081681 A1* | 3/2015 | Vohra | G06F 16/2457 |
| | | | 707/723 |
| 2015/0331847 A1* | 11/2015 | Jung | G06F 16/3341 |
| | | | 707/739 |
| 2016/0093299 A1* | 3/2016 | Su | G10L 25/57 |
| | | | 704/246 |
| 2016/0246870 A1* | 8/2016 | Anantharangachar | G06F 16/35 |
| 2021/0390297 A1* | 12/2021 | Sakaguchi | G06F 40/30 |
| 2022/0179906 A1* | 6/2022 | Desai | G06F 16/93 |
| 2023/0027526 A1* | 1/2023 | Kim | G06N 3/088 |
| 2024/0013067 A1* | 1/2024 | Azarafrooz | G06F 21/602 |
| 2024/0086635 A1 | 3/2024 | Fume | |

OTHER PUBLICATIONS

Prannay Khosla et al., "Supervised Contrastive Learning," 34th Conf. on Neural Info. Proc. Sys. (NeurIPS 2020), arXiv:2004.11362v5, 23 pages (2020).

* cited by examiner

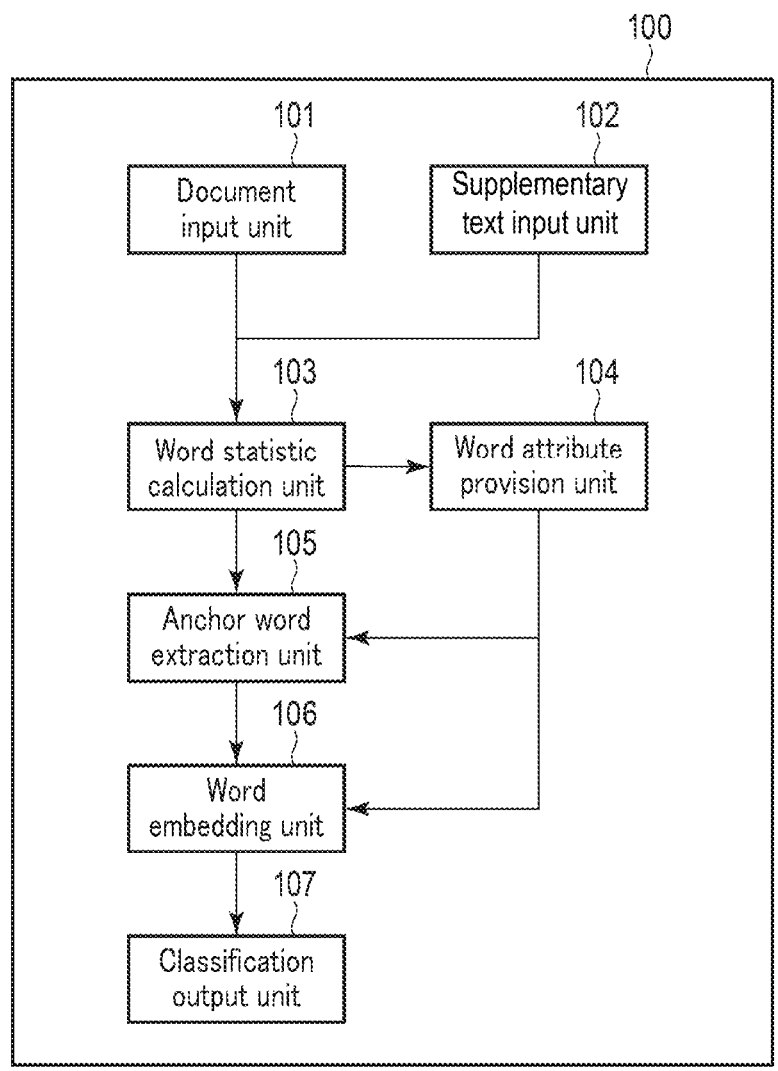
F I G. 1

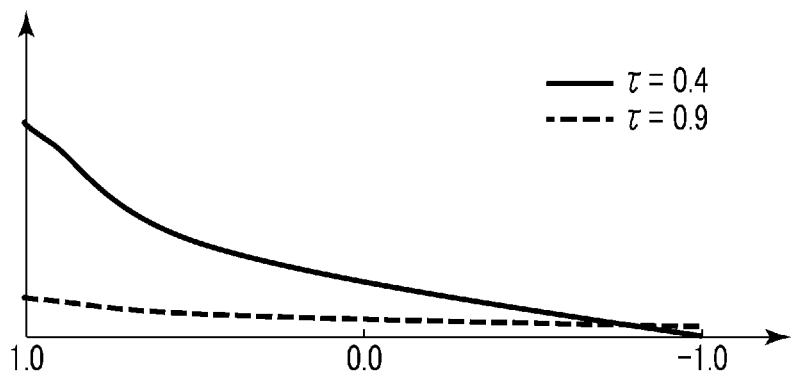

FIG. 3

| | ICD code definition sentence |
|---|---|
| I49 | Other cardiac arrhythmias |
| I49.0 | Ventricular fibrillation and flutter |
| I49.1 | Atrial premature depolarization |
| I49.2 | Junctional premature depolarization |
| I49.3 | Ventricular premature depolarization |
| I49.4 | Other and unspecified premature depolarizations |
| I49.5 | Sick sinus syndrome |
| I49.8 | Other specified cardiac arrhythmias |
| I49.9 | Cardiac arrhythmia, unspecified |
| I50 | Heart failure |
| I50.0 | Congestive heart failure |
| I50.1 | Left ventricular failure |
| I50.9 | Heart failure, unspecified |

FIG. 4

{
 'Warfarin' : 1
 'Weil's disease': 1,
 'Kawasaki disease': 1,
 'Riboflavin' : 1
 ...
} G1:Technical terms appearing in specific code type {
 'Amblyopia': 1,
 'Inappropriate': 1,
 'Extension': 1,
 'Abortion' : 1,
 'Appropriate': 1,
 'Role': 1,
 ...
} G2:General-purpose words appearing in specific code type {
 'Drying': 8,
 'Emesis': 8,
 'Depletion': 8,
 'Flies': 8,
 'Heart failure': 8,
 'Valve': 8, :
} G3:Specialized/general-purpose words across code types

F I G. 5

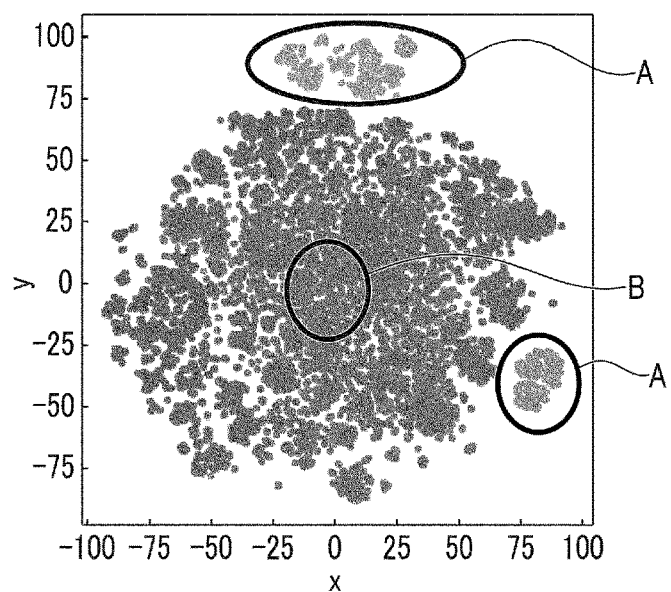

F I G. 6

Statistic of association class

| Class label | Current value | Changed value |
|---|---|---|
| F00(Alzheimer's) | 62.5% | 71.3% ↗ |
| G30(Alzheimer's) | 83.7% | 82.9% ↘ |

F I G. 11

F I G. 12

DOCUMENT CLASSIFICATION APPARATUS, METHOD, AND STORAGE MEDIUM

CROSS-REFERENCE TO RELATED APPLICATION

This application is based upon and claims the benefit of priority from Japanese Patent Application No. 2022-193031, filed Dec. 1, 2022, the entire contents of which are incorporated herein by reference.

FIELD

Embodiments described herein relate generally to a document classification apparatus, a method, and a storage medium.

BACKGROUND

There are some cases that are required to provide a classification code determined in an industry to a large number of documents accumulated in daily business operation. Examples of the cases include the provision of a patent classification code (theme code) to a patent document, the provision of an international classification of diseases (ICD) code to a report of death for vital statistics, and the provision of an event error code, a device code, and a corresponding department name code to a trouble report. Providing classification codes corresponding to purposes and applications to documents and systematically classifying the documents in accordance with the provided classification codes enables easy analysis and/or search utilizing the classification codes. On the other hand, in order to provide an appropriate code to each of a large number of documents accumulated every day, a very large amount of labor and cost are required.

In order to automate such document classification, there is known a method of automatically performing document classification using a trained neural network. In this method, a pair of an input document and a correct classification code is created, which is then used for training the neural network as a training example of machine learning. Thus, since a latent correspondence can be modeled, it is possible to obtain a model capable of outputting a probable classification code when an unknown input is given.

In particular, in recent years, an approach has been used in which a document in Wikipedia or a Web document is used for training in advance as a corpus for an input document to complement background knowledge in advance. In this method, it is possible to train a classification system corresponding to a business serving as an object while utilizing a base model trained in advance without constructing a document classification model corresponding to the business serving as an object from scratch.

In such document classification specialized in business, in addition to a code system, supplementary text such as an explanatory sentence and definition sentence of the code are present in many cases. The supplementary text often include technical terms specialized for each business domain, such as "things relating to", "ventricular fibrillation and flutter", "lifting apparatus for agricultural work", and "social statistics section". These supplementary text are often short texts, and are often formed of sentences relatively shorter than the input documents serving as classification target or the corpus data used as prior knowledge. These short texts are very easy-to-understand and effective information for a person to consider the contents of the texts and use the contents as a clue for classification.

However, in a case where a document classification model is constructed by machine learning using a supplementary text formed of a short text, since the features of words appearing in the short text are largely different from the features of words appearing in an input document or a general-purpose corpus, each word in the short text is treated in an excessively weighted manner, or conversely, an important keyword characterizing a category is buried in general words. Therefore, there is a problem in that supplementary text cannot be used well for the construction of the document classification model. For example, in a case where a definition sentence of a classification code is simply combined with an input document and used for training, the classification accuracy may be rather reduced.

BRIEF DESCRIPTION OF THE DRAWINGS

FIG. 1 is a diagram illustrating an example of a configuration of a document classification apparatus according to an embodiment.

FIG. 3 is a diagram for explaining the influence of temperature parameters on the loss function.

FIG. 4 is a diagram illustrating an example of ICD code definition sentences used as supplementary text.

FIG. 5 is a diagram illustrating an example in which words included in the ICD code definition sentences in FIG. 4 are classified in accordance with features.

FIG. 6 is a diagram illustrating an example of a word embedded space constructed using the ICD code definition sentences in FIG. 4.

FIG. 11 is a diagram illustrating an example of a display screen according to the modification.

FIG. 12 is a diagram illustrating an example of a configuration of a document classification apparatus according to an application example.

DETAILED DESCRIPTION

Figure 2:
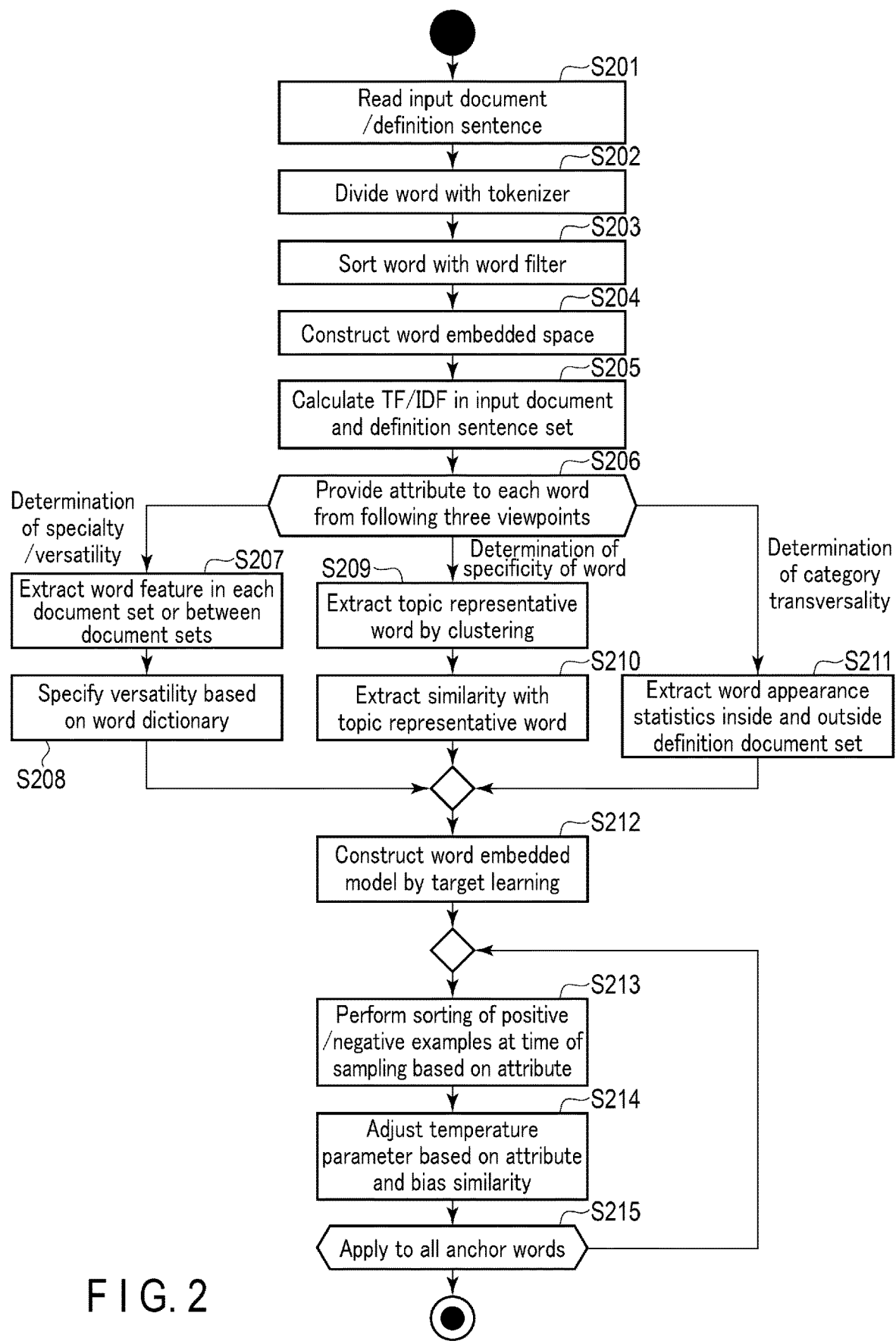
FIG. 2 is a flowchart illustrating a processing procedure of word embedded space update processing executed with the document classification apparatus according to the embodiment.

In general, according to one embodiment, a document classification apparatus includes a processing circuit. The processing circuit configured to: divide a sentence included in a target document serving as classification target into word units; divide a sentence included in a supplementary text indicating a feature of a classification item into word units; calculate an appearance statistic of a word obtained from the target document and the supplementary text; provide, to the word, an attribute representing at least one feature of specialty, specificity, and category independence based on the appearance statistic; extract an anchor word from words included in the supplementary text based on the attribute; perform target learning in accordance with an attribute of the anchor word and generate a word embedding vector; and estimate a classification category of a document based on the word embedding vector.

An embodiment of a document classification apparatus, a method, and a storage medium will be explained below in detail with reference to drawings. In the following explanation, constituent elements having substantially the same functions and structures are denoted by the same reference numeral, and an overlapping explanation will be made only when necessary.

Embodiment

FIG. 1 is a diagram illustrating a configuration of a document classification apparatus 100 according to an embodiment. The document classification apparatus 100 is an apparatus receiving input of document data of a target document serving as classification target, and analyzing and classifying the input target document (hereinafter also referred to as an input document). As the input document, for example, a report of death or diagnostic report in vital statistics can be used. In this case, the document classification apparatus 100 estimates an international classification of disease (ICD) code from words or texts included in the report of death or diagnostic report, and outputs the estimation result of the ICD code. As the input document, for example, a patent document can be used. In this case, the document classification apparatus 100 estimates the International Patent Classification (IPC) codes from texts included in patent documents, and outputs the estimation result of the IPC codes. In addition, documents other than a report of death and a patent document may be used as the input document. For example, many documents such as a general business document and a questionnaire document can be used as the input document.

The document classification apparatus 100 is connected to a server and/or a system managing document data via a network or the like. The network is, for example, a LAN (Local Area Network). Connection to the network may be wired connection or wireless connection. The network is not limited to a LAN, but may be the Internet or a public communication line.

The document classification apparatus 100 includes a processing circuit managing the whole document classification apparatus 100, and a storage medium (memory). The processing circuit is a processor executing functions of a document input unit 101, a supplementary text input unit 102, a word statistic calculation unit 103, a word attribute provision unit 104, an anchor word extraction unit 105, a word embedding unit 106, and a classification output unit 107, by invoking and executing a program in the storage medium. The processing circuit is formed of an integrated circuit including a CPU (Central Processing Unit), an ASIC (Application Specific Integrated Circuit), or a FPGA (Field Programmable Gate Array) or the like. The processor may be formed of one integrated circuit or a plurality of integrated circuits.

The storage medium stores a processing program used with the processor and parameters and tables and the like used for arithmetic operation in the processor. The storage medium is a storage device, such as an HDD (Hard Disk Drive), an SSD (Solid State Drive), and an integrated circuit storing various types of information. The storage device may be a portable storage medium, such as a CD (Compact Disc), a DVD (Digital Versatile Disc), and a flash memory, as well as an HDD and an SSD, or may be a driving device reading and writing various types of information from and to a semiconductor memory device, such as a flash memory and a RAM (Random Access Memory).

A single processing circuit may achieve the functions of the document input unit 101, the supplementary text input unit 102, the word statistic calculation unit 103, the word attribute provision unit 104, the anchor word extraction unit 105, the word embedding unit 106, and the classification output unit 107, or a processing circuit may be formed of a combination of a plurality of independent processors and the functions of the units may be achieved by execution of programs with the processors. The functions of the document input unit 101, the supplementary text input unit 102, the word statistic calculation unit 103, the word attribute provision unit 104, the anchor word extraction unit 105, the word embedding unit 106, and the classification output unit 107 may be implemented as individual hardware circuits.

The document input unit 101 divides a sentence included in a target document serving as classification target into word units. Specifically, the document input unit 101 first acquires text information from the target document serving as classification target, and divides each sentence included in the text information into word units with a tokenizer.

The supplementary text input unit 102 divides a sentence included in a supplementary text indicating a feature of a classification item into word units. The supplementary text input unit 102 acquires text information from the supplementary text, and divides each sentence included in the text information into word units with the tokenizer.

Supplementary text are documents given as external knowledge and including information serving as a clue for document classification. Generally, supplementary text are prepared for classification codes of various fields, and the supplementary text describe the contents thereof using short sentences and/or terms. For example, a definition sentence in which the definition of the classification item is described, an explanatory sentence in which the description of the feature of the classification item is described, or a sentence that supplements the information of the classification item is used as the supplementary text. The supplementary text may include information on classification items in the whole classification system. In general, the supplementary text is formed of short texts (short sentences).

The word statistic calculation unit 103 calculates appearance statistics of each word obtained from the target document and the supplementary text. For the appearance statistics, statistics for the word, statistics indicating a co-occurrence relation with other words, or statistics using topic clustering are used. The appearance statistics indicate features such as whether or not each word appears in a specific document set, whether or not each word appears across documents, and whether or not each word tends to appear only in a specific sentence or document set. For the calculation of the appearance statistics, for example, TF (Term Frequency), DF (Document Frequency), TF/IDF (Inverse Document Frequency), KL divergence (Kullback-Leibler divergence), similarity to topic representative words by topic clustering, or the like is used.

The word attribute provision unit 104 provides, to each word, attributes indicating at least one feature among specialty, specificity and category independence based on the appearance statistics. The attributes include at least one of a value indicating the specialty of the word (hereinafter referred to as a specialty attribute value), a value indicating the specificity of the word (hereinafter referred to as a specificity attribute value), and a value indicating the category independence of the word (hereinafter referred to as an independence attribute value). The attributes provided to the word may include all of the above three attribute values, may include only one of the above three attribute values, or may include two of the above three attribute values.

The specialty attribute value is a value indicating a feature relating to the specialty or versatility of the word. For example, a larger specialty attribute value indicates that the word is specialized, and a smaller specialty attribute value indicates that the word is highly versatile (polysemic).

The specificity attribute value is a value indicating a feature relating to the specificity of the word. For example, a larger specificity attribute value indicates that the word is a characteristic word. For example, a closer distance from the topic representative word in the topic clustering provides a larger value as the specificity attribute value. A lower specificity attribute value indicates that the word is a general word.

The independence attribute value is a value indicating a feature relating to the independence of the word. For example, a larger independence attribute value indicates the number of classification items (categories) in which the word appears in supplementary text is small, and that the word is a category-specific word that appears only in supplementary text of a specific category. A lower independence attribute value indicates that the word appears in a plurality of supplementary text.

The anchor word extraction unit 105 extracts anchor words from words included in the supplementary text based on the attributes. A larger specialty attribute value, specificity attribute value, and independence attribute value indicate that the word is important in document classification. Therefore, the anchor word extraction unit 105 determines that a larger value of the feature quantity obtained by integrating the specialty attribute value, the specificity attribute value, and the independence attribute value is that the word is important in document classification, and preferentially extracts the word as the anchor word. The anchor word is used for intermediate processing of the system in target learning described later by the word embedding unit.

The word embedding unit 106 analyzes text content of the target document and the supplementary text, and constructs a word embedded space. The word embedded space has multidimensional vector information set for each word forming the word embedded space. A unit such as a word, a compound word, and a subword can be used as the word of the word embedded space. When the word embedded space is constructed, it is preferable to use, as a base, a document classification model in which a document in Wikipedia or a Web document is used for training in advance as a corpus.

The word embedding unit 106 performs target learning in accordance with the attributes of the anchor word, generates word embedding vectors, and updates the word embedded space. In this operation, the word embedding unit 106 selects, as an anchor word, a word having high specialty, specificity, or category independence from the words included in the supplementary text, and uses the selected word for target learning. For example, the word embedding unit 106 extracts a co-occurring word that appears in the same supplementary text as the anchor word, and calculates the similarity between the anchor word and the co-occurring word based on the attribute provided to the co-occurring word and the attribute provided to the anchor word. The word embedding unit 106 uses the anchor word and the co-occurring word as positive examples in the target learning if the calculated similarity is high, and uses the anchor word and the co-occurring word as negative examples in the target learning if the calculated similarity is low.

The classification output unit 107 outputs a class classification result serving as an object. For example, the classification output unit 107 outputs a classification result of the input document using the word embedded model updated with the word embedding unit 106 and embedding information of the feature quantity of the classification target. An ordinary machine learning model used for document classification, such as CNN (Convolutional Neural Network) and RNN (Recurrent Neural Network), can be used for the classification output unit 107.

The following is a brief explanation of operation of document classification processing executed with the classification output unit 107. The document classification processing is processing of providing classification to input documents using the updated word embedded model. This explanation illustrates the case of providing classification of the ICD code to the input report of death, as an example.

In the document classification processing, the classification output unit first acquires a report of death as an input document to be classified, executes natural language analysis for the acquired report of death, and acquires text data written in the report of death in word units. Thereafter, the classification output unit sets a word vector as a word embedded expression for each of the acquired words using the updated word embedded model. The classification output unit adds up the word vectors set for the respective words to calculate a feature vector of the whole input document.

Thereafter, the classification output unit acquires the feature vector of the whole input document and word embedded models of class features for classification. For example, word embedded spaces constructed for respective classification codes of the ICD codes are used as word embedded models of class features. The classification output unit executes classification for the input document using the feature vector of the whole input document and the word embedded models of the classification classes. For example, as a classification result for the input report of death, the code name of the ICD codes is provided, and the classification result is output.

The following is an explanation of operation of word embedded space update processing executed with the document classification apparatus 100. FIG. 2 is a flowchart illustrating an example of a procedure of word embedded space update processing. The word embedded space update processing is processing of updating the word embedded space used for document classification, in consideration of the attribute of the word provided in advance. The processing procedure in each processing explained hereinafter is a mere example, and each processing can be properly changed as long as possible. In the processing procedure explained hereinafter, steps can properly be omitted, replaced, and added in accordance with the form of implementation.

(Word Embedded Space Update Processing)

Step S201

The user first inputs target documents serving as processing targets and definition sentences. The document input unit 101 and the supplementary text input unit 102 distinguish the data source from which each input data is derived, and determine whether each read data is a target document serving as a processing target (hereinafter referred to as an input document) or a supplementary text. The document input unit 101 reads the input document. The supplementary text input unit 102 reads a definition sentence as a supplementary text.

Step S202

Thereafter, the document input unit 101 divides each sentence included in the read input document into word units. The supplementary text input unit 102 divides each sentence included in the read definition sentence into word units. For the division into word units, for example, a tokenizer is used. In this case, a morpheme analyzer is applied to a sentence using a tokenizer to obtain a delimiter divided into morpheme units. Alternatively, instead of using a tokenizer, subwords using sentence pieces may be output from a text group of an input sentence to obtain information in word units.

Step S203

Thereafter, the document input unit 101 sorts a word serving as a processing target from the words obtained by dividing the input document using a word filter. The supplementary text input unit 102 sorts a word serving as a processing target from the words obtained by dividing the definition sentence using a word filter. For example, the document input unit 101 and the supplementary text input unit 102 exclude particles, symbols, numerical values, conjunctions, and the like which are difficult to be treated as clues for classification, and sorts nouns, named entities, and the like as words serving as processing targets.

Step S204

Thereafter, the word embedding unit 106 constructs a word embedded expression (hereinafter referred to as a word embedded space) using the word sorted as a processing target by the processing in Step S203. For the construction of the word embedded space, for example, there is used a method of representing each word with a constant vector length while using a neural network to set a neighboring appearing word as a context and embedding peripheral information. For example, word2vec can be used for the construction of the word embedded space. By constructing the word embedded space, the similarity between words can be measured.

Step S205

Thereafter, the word statistic calculation unit 103 calculates a statistic of a word for each word included in the input document and the definition sentence as information on how each word appears. For example, each statistic such as TF/IDF used in a subsequent step is calculated.

Step S206

Thereafter, the word attribute provision unit 104 provides an attribute as an additional feature quantity to each word included in the input document and the definition sentence using the calculated statistic. In this operation, the word attribute provision unit 104 provides "specialty attribute value", "specificity attribute value", and "independence attribute value" to each word as attributes. The specialty attribute value is a feature quantity indicating a feature relating to the specialty or versatility of the word. The specialty attribute value is calculated by determining the specialty or versatility of the word. The specificity attribute value is a feature quantity indicating a feature relating to the specificity of the word. The specificity attribute value is calculated by determining the specificity of the word. The independence attribute value is a feature quantity indicating a feature relating to the independence of the word. The independence attribute value is calculated by the determination regarding the category independence. The following is an explanation of the calculation method of each attribute value.

(Calculation of Specialty Attribute Value)

Step S207

In the determination of the specialty or versatility of a word, a word included in a specific technical term dictionary or a word determined as an unknown word as a morpheme analysis result is determined as a word having a specialty. Specifically, a word feature quantity in each document set or between document sets is first extracted. As the word feature quantity, the value of TF/IDF is extracted as, for example, the appearance statistic among the appearance statistics calculated in the processing in Step S204.

Step S208

Thereafter, the specification of versatility (or specialty) based on a word dictionary is performed. In this operation, for each word, the difference between the appearance statistic in the word dictionary and the extracted appearance statistic is calculated, and weighting is performed in accordance with the calculation result. Thereafter, the weighted values are normalized to a value ranging from −1 to 1. This explanation is assumed to be normalized such that a higher specialty causes the numerical value to be closer to 1, and a higher versatility causes the numerical value to be closer to −1.

(Calculation of Specificity Attribute Value)

Step S209

In the determination of the specificity of the word, some topic representative words are first extracted in a document set by clustering using a topic clustering method.

Step S210

Thereafter, as the degree of having the property as the topic representative word, the similarity of each word with the topic representative word is calculated, and weighting is performed in accordance with the calculation result. Thereafter, the weighted values are normalized to a value ranging from −1 to 1. This explanation is assumed to be normalized such that a higher similarity of the topic to the representative word causes the numerical value to be closer to 1, and a lower similarity of the topic to the representative word causes the numerical value to be closer to −1.

(Calculation of Independence Attribute Value)

Step S211

In the determination of the category independence, a word appearance statistic in the definition document set is calculated. Specifically, in the definition sentences of a plurality of categories serving as classification targets, weighting is performed in accordance with the property of whether the word appears across a plurality of categories or appears uniquely in a specific category. Thereafter, the weighted values are normalized to a value ranging from −1 to 1. This explanation is assumed to be normalized such that a word existing only in a specific category and being independent causes the numerical value to be closer to 1, and a word appearing across categories causes the numerical value to be closer to −1.

Step S212

Thereafter, the word embedding unit 106 constructs a word embedded model by executing target learning using the attribute values of the word for the word embedded space. Thereafter, the weighting change as a temperature parameter is performed.

Step S213

In the target learning, the word embedding unit 106 first performs sorting of positive/negative examples at the time of sampling for each word based on the attribute provided to each word. In this operation, the word embedding unit 106 performs, for the anchor word in the mini-batch, determination of positive/negative examples for the anchor word.

Step S214

Thereafter, the word embedding unit 106 adjusts the temperature parameter based on the provided attribute for the anchor word in the mini-batch and biases the similarity. In this operation, the word embedding unit 106 changes the weighting relating to the temperature parameter of each word based on the attribute. The temperature parameter is a parameter used for the loss function in supervised target learning. The processing in Step S214 may be omitted.

For example, the word embedding unit 106 adjusts the temperature parameter used in the loss function using the attribute similarity of the anchor word, which will be described later. FIG. 3 is a diagram illustrating a change in penalty due to a change in temperature parameter. The horizontal axis in FIG. 3 indicates the attribute similarity, and the vertical axis in FIG. 3 indicates the magnitude of the penalty in the loss function.

As illustrated in FIG. 3, in the loss function, a smaller value of the temperature parameter causes a larger penalty in a case where the attribute similarity is high. For example, if the attribute similarity (cosine similarity) calculated for each of the plurality of peripheral words in the anchor word takes a close value, each of the peripheral words is treated as a negative example, so that the influence of the difference in attribute on the word embedded model is small, and the attribute is unlikely to be a useful clue. Thus, by setting the temperature parameter to a small value in a case where the difference in attribute similarity between the plurality of peripheral words and the anchor word is small, the penalty in a case where the attribute similarity is high becomes large, the difference in attribute similarity between the plurality of peripheral words and the anchor word greatly affects the word embedded model, and the attribute of each word is effectively reflected in the word embedded model.

Step S215

The word embedding unit 106 repeatedly executes the processing in Step S213 and Step S214 on all the anchor words in the mini-batch, and updates the word embedded model. When the processing in Step S213 and Step S214 is completed for all the anchor words, the word embedded space update processing ends.

Specific Example

This explanation specifically illustrates the flow of a series of processing of the word embedded space update processing as an example of a case where the classification of the ICD code is provided to a report of death. This explanation illustrates, as an example, a case where a report of death is used as a target document and a definition sentence of the ICD code defined by WHO for disease name classification is used as a supplementary text.

FIG. 4 illustrates an example of definition sentences of the ICD code. For example, the code "150.0" describes "congestive heart failure" as a definition sentence, and the code "150.1" describes "left ventricular failure" as a definition sentence. FIG. 5 is a diagram illustrating an example in which words included in the definition sentences in FIG. 4 are classified into three word groups G1, G2, and G3 in accordance with features. The number attached to the right of the words represents the appearance frequency of the word in the definition sentences of the ICD code.

The word group G1 includes words that appear only in specific code types and are specialized. The word group G1 indicates that "warfarin", "Weil's disease", "Kawasaki disease", and the like are included in the word having an appearance frequency of 1 in the code definition sentence. Since the word included in the word group G1 appears only once in the code system, if the word included in the word group G1 is included in the input document, the code to be provided to the input document is uniquely determined.

The word group G2 includes words that appear only in specific code types and are highly versatile. Unlike specialized words such as "warfarin" included in the word group G1, highly versatile words are expected to appear frequently in input documents and corpora. Therefore, although the appearance frequency in the definition sentence is 1, the appearance frequency is not exclusive information for discriminating the code, and even if the word included in the word group G2 is included in the input document, the code to be provided cannot be uniquely specified.

The word group G3 includes words that appear across definition sentences of a plurality of codes. For example, words such as "valve" and "heart failure" are technical terms specialized in the medical field, but since eight words each appear in the code system, even if these words are included in the input document, these words are words that cannot uniquely determine the code. On the other hand, since words such as "drying", "depletion", and "flies" are general terms, a code to be provided cannot be uniquely specified, but since the appearance frequency is eight, the number of codes to be provided can be limited to several thousands to eight.

FIG. 6 illustrates a word embedded space constructed using the definition sentences of the ICD code in FIG. 4. The word embedded space in FIG. 6 is visualized by providing an embedding vector to each word of the definition sentences of the ICD code, clustering the ICD code based on the inter-vector similarity of each word, and plotting the clustering result on a two-dimensional plane. In a region A at the upper portion or the lower right portion of FIG. 6, the density of the plot is different from that in other regions, and the region A is classified into a different code. It is expected that the words included in this region are well distinctive from other words and are exclusive to other codes. On the other hand, in regions such as a region B at the center of FIG. 6, a plurality of codes is mixed. The words included in such regions are used in a duplicated manner for a plurality of different codes, and do not include clear information for uniquely specifying a code.

Figure 7:
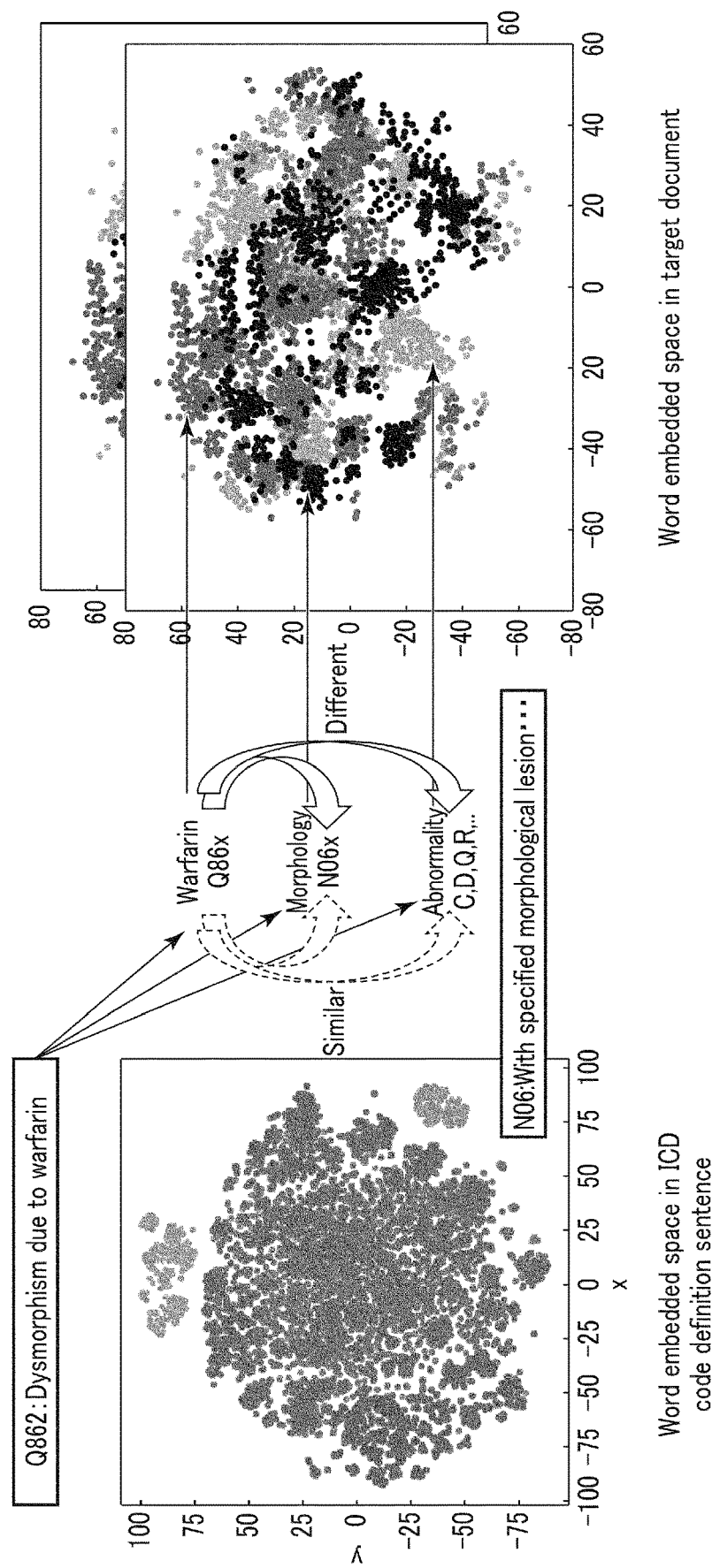
FIG. 7 is a diagram for explaining the flow of the word embedded space update processing.

FIG. 7 is a diagram for explaining a series of flows of the word embedded space update processing. This explanation illustrates, as an example, processing for a word included in a definition sentence "Dysmorphism due to warfarin". The definition sentence "Dysmorphism due to warfarin" is defined in the category "Q862" in the ICD code definition sentence in FIG. 4. When the definition sentence is input, three words of "warfarin", "morphology", and "abnormality" are extracted from the definition sentence of "Dysmorphism due to warfarin" by the processing in Step S201 to Step S203. The diagram on the left side of FIG. 7 illustrates an example of the word embedded space constructed by the ICD code definition sentence in the processing in Step S204. Since "warfarin", "morphology", and "abnormality" co-occur in the definition sentence of the category "Q862", the words are determined as similar words, and the word embedded space is constructed so that the words are located close to each other in the word embedded space.

Thereafter, by the processing in Step S205 to Step S210, three attributes of "specialty attribute value", "specificity attribute value", and "independence attribute value" are provided to each of the three words of "warfarin", "morphology", and "abnormality". This explanation is assumed that the parameter of [specialty attribute value, specificity attribute value, independence attribute value] provided to "warfarin" is [1.0, 1.0, 1.0], the parameter provided to "morphology" is [−0.3, −0.3, 0.1], and the parameter provided to "abnormality" is [0.0, 0.3, −0.4].

Thereafter, by the processing in Step S212 and Step S213, sorting of positive/negative examples at the time of sampling is performed for each word based on the attribute provided to each word. In the processing in Step S213, the attribute similarity between the respective words of "warfarin", "morphology", and "abnormality" is first calculated. Cosine similarity can be used as the attribute similarity. This explanation illustrates that the cosine similarity "cos_sim (warfarin, morphology)" between "warfarin" and "morphology", the cosine similarity "cos_sim (warfarin, abnormality)" between "warfarin" and "abnormality", and the cosine similarity "cos_sim (morphology, abnormality)" between "morphology" and "abnormality" are calculated as in the following Equation (1). In Equation (1), "cos_sim (X, Y)" represents the cosine similarity between the word "X" and the word "Y".

$$\left.\begin{array}{l}\text{cos\_sim (warfarin, morphology)} = -0.662\\ \text{cos\_sim (warfarin, abnormality)} = -0.115\\ \text{cos\_sim (morphology, abnormality)} = -0.596\end{array}\right\} \quad (1)$$

Thereafter, for each word, the size of a vector in a case where a plurality of provided attribute values is used as vectors is calculated as an attribute feature quantity obtained by integrating the attribute values. This explanation illustrates that the attribute feature quantities of "warfarin", "morphology", and "abnormality" are calculated as in the following Equation (2). In Equation (2), "norm (X)" represents the size of the vector of the word "X". Equation (2) illustrates the result rounded off to the fourth decimal place.

$$\left.\begin{array}{l}\text{norm (warfarin)} = 1.732\\ \text{norm (morphology)} = 0.436\\ \text{norm (abnormality)} = 0.5\end{array}\right\} \quad (2)$$

Thereafter, words are extracted in descending order of the attribute feature quantity, and sampling is executed using the extracted words as anchor words. This explanation illustrates that "warfarin" having the largest attribute feature quantity among "warfarin", "morphology", and "abnormality" is first selected as the anchor word.

Thereafter, for the selected anchor word, the relationship to the word appearing in the same sentence in the definition sentence is used for training, and the word space model is updated. Conventionally, all words co-occurring in the same sentence have been used for training as positive examples to be brought closer in the word embedded space. On the other hand, in the present embodiment, based on the attribute similarity (cosine similarity) calculated in advance, it is individually determined whether the relationship between the co-occurring words should be a positive example to be brought closer in the word embedded space or a negative example to be distanced in the word embedded space.

For example, threshold processing is performed on the attribute similarity calculated by Equation (2) to determine whether the relationship between the words is used for training as a positive example or a negative example. If the attribute similarity is greater than the threshold, it is determined that the relationship between the words is close, and it is determined as a positive example. On the other hand, if the attribute similarity is less than the threshold, it is determined that the relationship between the words is distant, and it is determined as a negative example. For example, "0" is used as the threshold. In the example of Equation (2), first, since the attribute similarity (cosine similarity) between "warfarin" and "morphology" is 0 or less, the relationship between "warfarin" and "morphology" is used for training as a negative example. Similarly, since the attribute similarity (cosine similarity) between "warfarin" and "abnormality" is 0 or less, the relationship between "warfarin" and "abnormality" is used for training as a negative example.

The value used as the threshold is not limited to "0", but may be set to an appropriate value in consideration of the value of the similarity, the distribution of the similarity including other words, and the like. For example, "−0.5" or "+0.1" may be used as the threshold.

By executing the target learning as described above, it is possible to finely adjust the words in the same sentence, which have been collectively treated as positive examples in conventional art, in accordance with the attributes thereof.

Effects of Embodiment

The following is an explanation of effects of the document classification apparatus 100 according to the present embodiment.

In a case where a document classification model is constructed by machine learning using a supplementary text formed of a short text such as a definition sentence, since the feature quantity of a word included in the short text in the definition sentence is largely different from the feature quantity of a word appearing in an input document or a general-purpose corpus, the word in the definition sentence may be treated in an excessively weighted manner, or conversely, an important word in the definition sentence characterizing a category may be buried in general words. Therefore, there is a problem in that it is difficult to effectively use the supplementary text formed of the short text for the construction of the document classification model. For example, in a case where a code definition sentence and an input document are simply combined and used, the classification accuracy may be rather reduced.

On the other hand, the document classification apparatus 100 according to the present embodiment can divide a sentence included in a target document into word units, divide a sentence included in a supplementary text indicating a feature of a classification item into word units, calculate an appearance statistic of a word obtained from the target document and the supplementary text, provide an attribute representing at least one feature of specialty, specificity, and category independence to the word based on the appearance statistic, extract an anchor word based on the attribute, and perform target learning in accordance with an attribute of the anchor word and generate a word embedding vector.

For example, the document classification apparatus extracts a co-occurring word that appears in the same supplementary text as the anchor word, calculates the similarity between the anchor word and the co-occurring word based on an attribute provided to the co-occurring word and an attribute provided to the anchor word, and uses the anchor word and the co-occurring word as positive examples in target learning if the similarity is high, and uses the anchor word and the co-occurring word as negative examples in target learning if the similarity is low.

With the structure described above, the document classification apparatus 100 according to the present embodiment can adjust the relationship between a plurality of words co-occurring in the same sentence, which has been collectively treated as positive examples in conventional art, in accordance with the features of the words by reducing the distance between words whose features are close to each other and increasing the distance between words whose features are distant from each other using the similarity of attributes reflecting the features such as specialty, specificity, and category independence of the words.

For example, in the ICD code definition sentence in FIG. 4, "warfarin" and "morphology" included in "Dysmorphism due to warfarin", which is a definition sentence of the category of "Q862", are words having different properties in terms of specialty, specificity, category independence, and the like of words, but are determined as words having close features because the words co-occur in the same sentence, and are treated as positive examples in target learning. On the other hand, according to the document classification apparatus 100 of the present embodiment, since the attribute similarity between "morphology" and "warfarin" is small, "warfarin" and "morphology" are treated as negative examples in the target learning, and as illustrated in FIG. 7, the word embedded space is updated so that the distance in the word embedded space increases.

As described above, it is possible to improve the classification performance of the document classification model by effectively utilizing the supplementary text formed of the short text provided separately from the input document. The word embedded space update processing can construct a word embedded model with improved classification performance by effectively using supplementary text. By executing document classification using the word embedded model constructed as described above, the classification performance can be improved.

The document classification apparatus 100 according to the present embodiment can select a word having high specialty, specificity, or category independence as an anchor word from the words included in the supplementary text. A larger specialty attribute value, specificity attribute value, and independence attribute value indicate that the word is important in document classification. Therefore, by preferentially using a word having high specialty, specificity, or category independence as an anchor word, the accuracy of target learning can be improved.

Modification

The following is an explanation of a modification. The present modification is acquired by modifying the structure of the embodiment as follows. An explanation of structures, operations, and effects similar to those of the embodiment will be omitted. The document classification apparatus 100 of the present modification explicitly presents the anchor word to the user, and causes the user to select the anchor word to be used for target learning, thereby reflecting the user's intention on the update of the word embedded model. In particular, the apparatus provides a means for updating the word embedded model by explicitly selecting a word to be considered by the user by presenting to the user an anchor word which is used as an intermediate output of the system and serves as a clue for updating the word embedded model.

Figure 8:
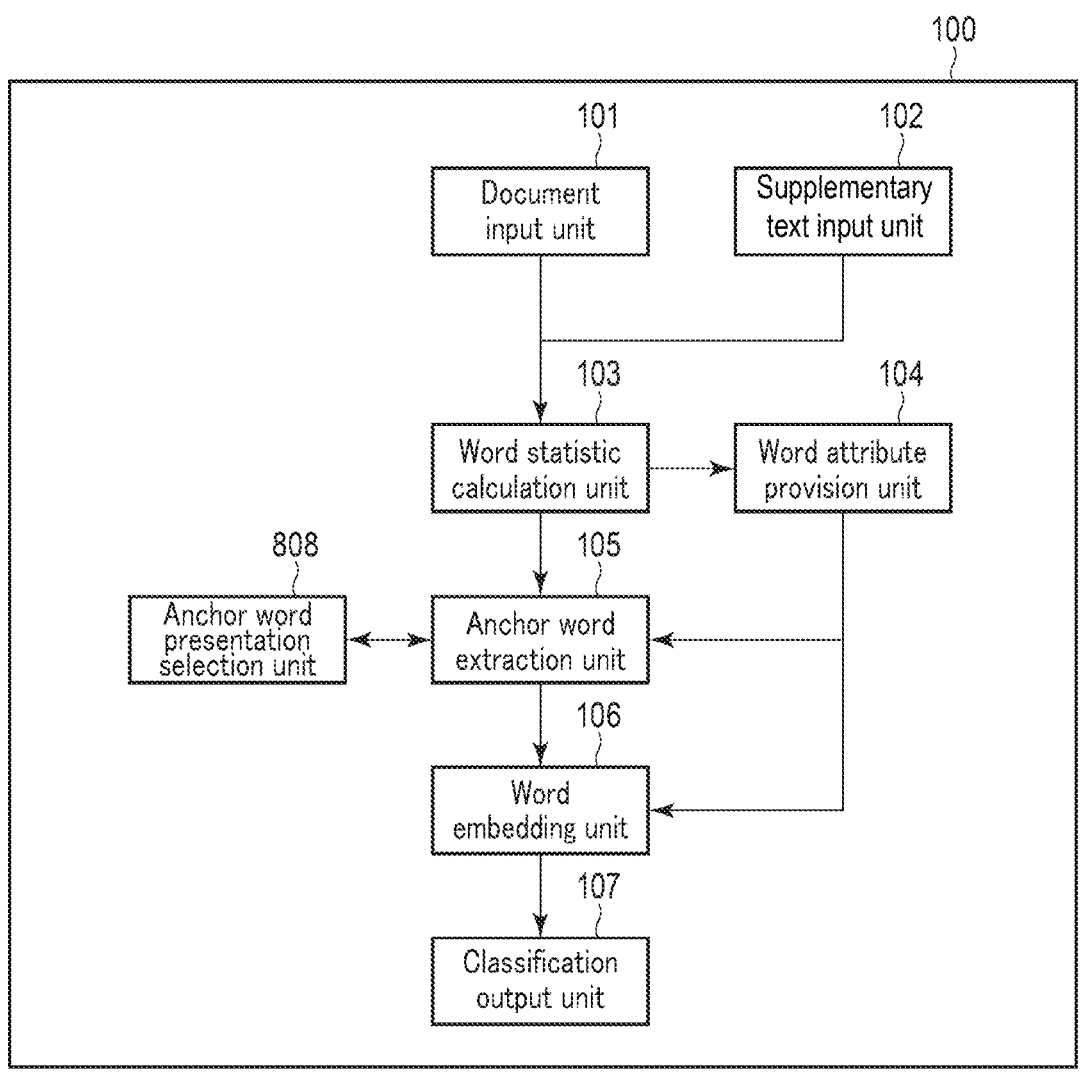
FIG. 8 is a diagram illustrating an example of a configuration of a document classification apparatus according to a modification.

FIG. 8 is a diagram illustrating a configuration of the document classification apparatus 100 according to the present modification. The document classification apparatus 100 further includes an anchor word presentation selection unit 808.

The anchor word presentation selection unit 808 presents the anchor word to the user, and receives a selection of the anchor word to be used for target learning. In the present modification, the anchor word presentation selection unit 808 presents the feature quantity of the anchor word to the user, and receives a change in the feature quantity. As the feature quantity, the attribute feature quantity described above can be used. The attribute feature quantity is a feature quantity obtained by integrating a plurality of attribute values provided to each word, and is obtained by, for example, calculating the size of a vector if the plurality of attribute values provided to each word is used as the vector. As a method of presenting the feature quantity to the user, for example, there is a method of displaying the feature quantity on a display device such as a display.

The anchor word presentation selection unit 808 further presents two words that are included in different sentences in the supplementary text and co-occur with the same word, and receives a selection of whether or not to use the two words for target learning.

Figure 9:
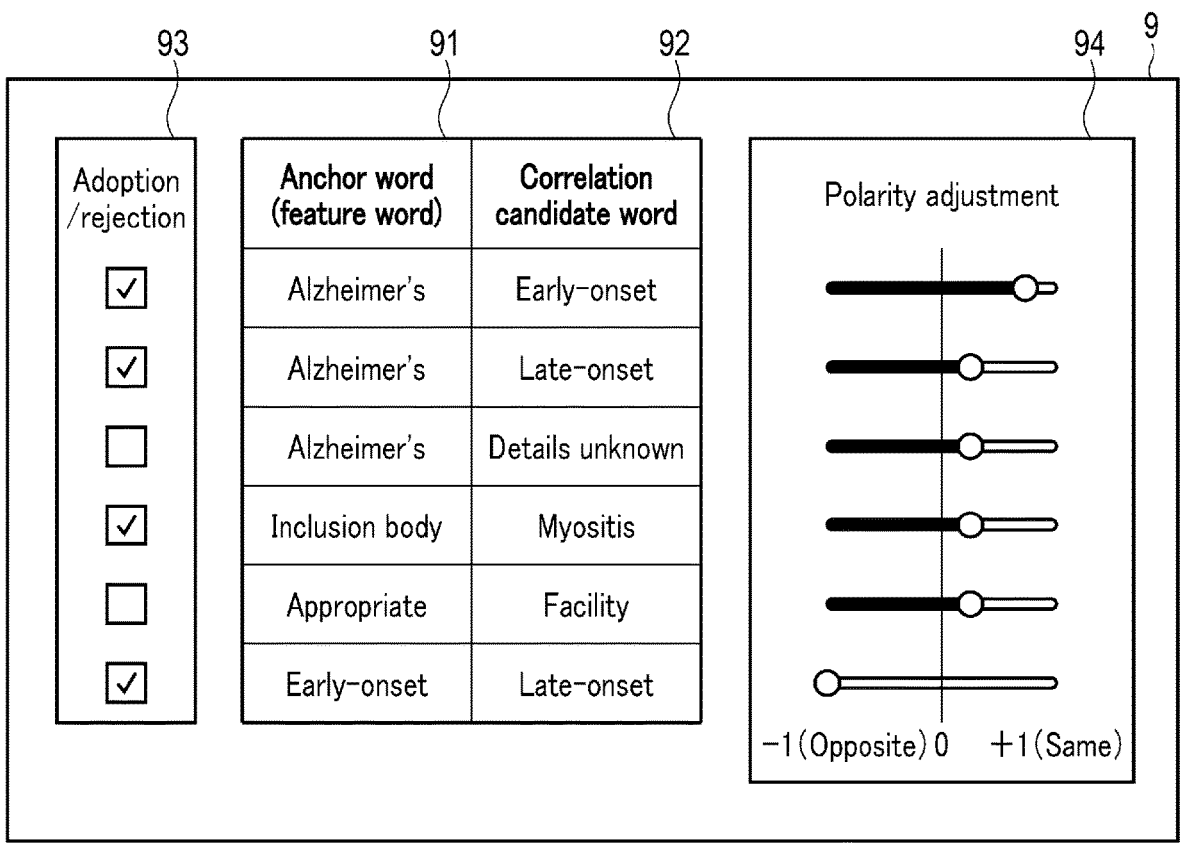
FIG. 9 is a diagram illustrating an example of a display screen according to the modification.

FIG. 9 is a diagram illustrating an example of a display screen presented to the user in a case where the ICD code definition sentence illustrated in FIG. 4 is used as a supplementary text. The display screen 9 in FIG. 9 includes a first word display section 91, a second word display section 92, an adoption/rejection selection section 93, and a polarity adjustment section 94. In the first word display section 91, words used as anchor words in the target learning are displayed. As described above, "warfarin" or the like having the largest attribute feature quantity among "warfarin", "morphology", and "abnormality" is selected as the anchor word by the processing of the anchor word extraction unit 105.

In the second word display section 92, correlation candidate words for the words displayed in the first word display section 91 are displayed. The correlation candidate words are words having a high possibility of having a correlation with the anchor word among the words included in the supplementary text. For example, words co-occurring in the same sentence as the anchor words in the supplementary text are used for the correlation candidate words.

In the adoption/rejection selection section 93, a check box is displayed for selecting whether or not to use each combination of the word displayed in the first word display section 91 and the word displayed in the second word display section 92 for the target learning. The user can select a combination of words to be adopted by selecting whether or not to enter a check in the check box.

The anchor word is extracted by the anchor word extraction unit 105, but those that can contribute to the target category serving as the classification target are not necessarily extracted. Therefore, the user who has knowledge of the domain serving as the classification target can intervene in the update of the word embedded model by selecting the combination of the anchor word and the correlation candidate word used for the target learning by himself/herself, and can obtain similar training effects without preparing a large amount of teaching data of positive examples and negative examples regarding the related category at the time of training.

In the polarity adjustment section 94, a slide bar is displayed which can adjust the value of the attribute similarity used to determine a positive example and a negative example in the target learning to an arbitrary value between −1 and +1. In the slide bar, the value of the attribute similarity calculated by the processing of the word embedding unit 106 is set in advance. By adjusting the value of the attribute similarity using the slide bar, the user designates a determination result as to whether the two words have a positive relationship of being similar to each other or a negative relationship of having opposite meanings. Therefore, the user who has knowledge of the domain serving as the classification target can intervene in the update of the word embedded model by giving the similarity determination to the combination of the anchor word and the correlation candidate word used for the target learning.

The words presented in the first word display section 91 and the second word display section 92 are not limited to the combination of the anchor word and the correlation candidate word. For example, the word in which the polarity adjustment is not executed among the words appearing in the supplementary text or the remaining words which are not presented as the anchor words among the words appearing in the supplementary text may be presented.

In the first word display section 91 and the second word display section 92, a combination of exclusive words appearing in definition sentences of different classification items may be presented. For example, the anchor word presentation selection unit 808 further presents two words that are included in different sentences in the supplementary text and co-occur with the same word, and receives a selection of whether or not to use the two words for target learning.

For example, "early-onset" and "late-onset" displayed in the first word display section 91 and the second word display section 92 enumerate exclusive words among words appearing in "early-onset Alzheimer's" and "late-onset Alzheimer's" which are different categories. Such a combination of words enables to obtain early confirmation that an exclusive word may be treated as an opposite word relationship by actively inquiring of the user about the determination of similarity, and to exclusively process a category in the update of the word embedded space.

In addition, the user may be enabled to easily check how the user's input as explained in FIG. 9 affects the classification performance of the word embedded model. In this case, the anchor word presentation and selection unit 808 presents a stored word embedded space to the user, and highlights and displays the word selected by the user on the word embedded space.

Figure 10:
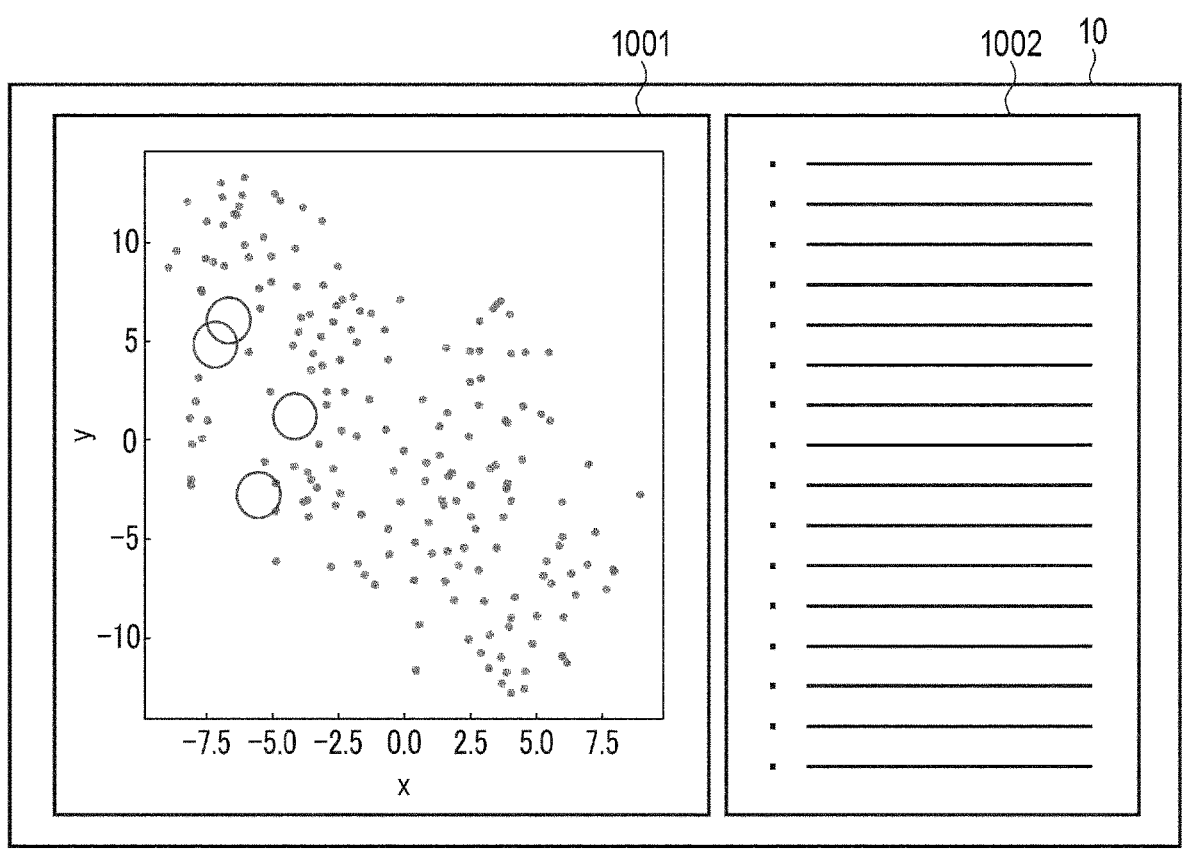
FIG. 10 is a diagram illustrating an example of a display screen according to the modification.

FIG. 10 is a diagram illustrating an example of a display screen 10 on which a word embedded space is displayed as feedback. The display screen 10 includes a word embedded space display section 1001 and a word list display section 1002. In the word embedded space display section 1001, the word embedded space at that point in time is displayed, and in the word list display section 1002, a list of words embedded in the word embedded space at that point in time is displayed. For example, when the user selects a word in the adoption/rejection selection section 93 or the polarity adjustment section 94 in FIG. 9, a corresponding plot in the word embedded space of the word embedded space display section 1001 is highlighted by circling or the like. The user can have an overview of information such as the position of the selected word in the word embedded space at that point in time and what kind of words are similar to the selected word or what kind of words are used for training separately from the selected word.

As a result of an instruction or an input given by the user, how the accuracy of category classification transitions in a target document classification task may be explicitly displayed. In this case, the anchor word presentation selection unit 808 estimates a change in the classification performance of the word embedded model or a change in the word embedded space due to the user's input, and presents the estimation result.

FIG. 11 is a diagram illustrating an example of a display screen 11 on which a change in the statistic relating to an association class is displayed as the feedback of the user's input. The display screen 11 includes a change display section 1101. In the change display section 1101, a prediction value relating to the association class is displayed in a case where the target learning in which the input by the user is reflected is performed. As the prediction value of the classification performance, for example, a ratio of words included in a specific classification item is used. The association class can be arbitrarily selected by the user.

By confirming whether the classification performance has changed as intended by the user, the user can give feedback to the system that performs document classification while confirming the user's instruction, the input validity, or the accuracy of the classification performance.

In the instruction means and the input means provided by the user interface in the present modification, it is not necessary for the user to instruct or input all the items presented from the system, and the system can receive and process the items input by the user in a range in which the user can input.

Application Example

FIG. 12 is a block diagram illustrating a hardware configuration of a document classification apparatus 1200 according to an application example. The application example is a specific example of the embodiment and the modifications, and has a form in which the document classification apparatus 100 is achieved with a computer.

The document classification apparatus 1200 includes a CPU (Central Processing Unit) 1201, a RAM (Random Access Memory) 1202, a program memory 1203, an auxiliary storage device 1204, and an input/output interface 1205, as hardware. The CPU 1201 communicates with the RAM 1202, the program memory 1203, the auxiliary storage device 1204, and the input/output interface 1205 via a bus. Specifically, the document classification apparatus 1200 according to the present embodiment is achieved with a computer of such a hardware configuration.

The CPU 1201 is an example of a general-purpose processor. The RAM 1202 is used with the CPU 1201 as a working memory. The RAM 1202 includes a volatile memory, such as a SDRAM (Synchronous Dynamic Random Access Memory). The program memory 1203 stores a data analysis program to achieve the units according to each embodiment. The data analysis program may be, for example, a program to cause a computer to achieve the functions of the document input unit 101, the supplementary text input unit 102, the word statistic calculation unit 103, the word attribute provision unit 104, the anchor word extraction unit 105, the word embedding unit 106, the classification output unit 107, and the anchor word presentation selection unit 808. For example, a ROM (Read-Only Memory), part of the auxiliary storage device 1204, or a combination thereof is used as the program memory 1203. The auxiliary storage device 1204 stores data in a non-transitory manner. The auxiliary storage device 1204 includes a nonvolatile memory, such as an HDD (hard disc drive) and an SSD (solid state drive).

The input/output interface 1205 is an interface to connect to other devices. The input/output interface 1205 is used for connection to, for example, a keyboard, a mouse, a database, and a display.

The data analysis program stored in the program memory 1203 includes a computer-executable instruction. When the data analysis program (computer-executable instruction) is executed with the CPU 1201 serving as a processing circuit, the data analysis program causes the CPU 1201 to execute predetermined processing. For example, when the data analysis program is executed with the CPU 1201, the data analysis program causes the CPU 1201 to execute a series of processes explained with respect to the units in FIG. 1 or FIG. 8. For example, the computer-executable instruction included in the data analysis program causes the CPU 1201 to execute a data analysis method, when it is executed with the CPU 1201. The data analysis method may include steps corresponding to the respective functions of the document input unit 101, the supplementary text input unit 102, the word statistic calculation unit 103, the word attribute provision unit 104, the anchor word extraction unit 105, the word embedding unit 106, the classification output unit 107, and the anchor word presentation selection unit 808 described above. In addition, the data analysis method may properly include the steps illustrated in FIG. 2.

The data analysis program may be provided to the document classification apparatus 1200 being a computer, in a state of being stored in a computer-readable storage medium. In this case, for example, the document classification apparatus 1200 further includes a drive (not illustrated) reading data from a storage medium, and acquires the data analysis program from the storage medium. Examples of the storage medium include a magnetic disk, an optical disk (such as a CD-ROM, a CD-R, a DVD-ROM, and a DVD-R), a magneto-optic disk (such as a MO), and a semiconductor memory, and they can be properly used. The storage medium may be referred to as "non-transitory computer-readable storage medium". The data analysis program may be stored in a server on a communication network, and the document classification apparatus 1200 may download the data analysis program from the server using the input/output interface 1205.

The processing circuit executing the data analysis program is not limited to general-purpose hardware, such as the CPU 1201, but may be a dedicated hardware processor, such as an ASIC (Application Specific Integrated Circuit). The term "processing circuit (processing unit)" includes at least one general-purpose hardware processor, at least one dedicated hardware processor, or a combination of at least one general-purpose hardware processor and at least one dedicated hardware processor. In the example illustrated in FIG. 12, the CPU 1201, the RAM 1202, and the program memory 1203 correspond to the processing circuit.

Thus, any of the embodiments described above can provide a document classification apparatus, method, and program having a document classification model that effectively uses a supplementary text including a short text.

While certain embodiments of the present invention have been described, these embodiments have been presented by way of example only, and are not intended to limit the scope of the invention. These embodiments may be implemented in various other forms, and various omissions, substitutions and changes may be made without departing from the spirit of the invention. These embodiments and modifications thereof are included in the scope and spirit of the invention, and are included in the scope of the invention described in the claims and equivalents thereof.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A document classification apparatus comprising a processing circuit,
the processing circuit configured to:
divide a sentence included in a target document serving as classification target into word units;
divide a sentence included in a supplementary text indicating a feature of a classification item into word units;
calculate an appearance statistic of a word obtained from the target document and the supplementary text, the appearance statistic representing a statistic of an occurrence of the word;
provide, to the word, an attribute representing at least one feature of specialty, specificity, and category independence based on the appearance statistic;
extract an anchor word from words included in the supplementary text based on the attribute;
perform target learning in accordance with an attribute of the anchor word and generate a word embedding vector; and
estimate a classification category of the target document based on the word embedding vector.

2. The document classification apparatus according to claim 1, wherein the processing circuit is configured to present the anchor word to a user and receive a selection of an anchor word to be used for the target learning.

3. The document classification apparatus according to claim 2, wherein the processing circuit is configured to calculate a feature quantity relating to a relationship between the words using the attribute, present a feature quantity of the anchor word to a user, receive a change in the feature quantity, and execute target learning of the anchor word in accordance with the feature quantity after the change.

4. The document classification apparatus according to claim 3, wherein the processing circuit is configured to further present two words that are included in different sentences in the supplementary text and co-occur with a same word, and receive selection of whether or not to use the two words for the target learning.

5. The document classification apparatus according to claim 3, wherein the processing circuit is configured to present a stored word embedded space to a user, and highlight and display a word selected by a user on the word embedded space.

6. The document classification apparatus according to claim 3, wherein the processing circuit is configured to estimate a change in a classification performance of a word embedded model or a change in a word embedded space due to a user's input, and present an estimation result.

7. The document classification apparatus according to claim 1, wherein the processing circuit is configured to extract a co-occurring word that appears in a same sentence in the supplementary text as the anchor word, calculate a similarity between the anchor word and the co-occurring word based on an attribute provided to the co-occurring word and an attribute provided to the anchor word, and use the anchor word and the co-occurring word as positive examples in target learning if the similarity is high, and use the anchor word and the co-occurring word as negative examples in target learning if the similarity is low.

8. The document classification apparatus according to claim 1, wherein the processing circuit is configured to select, as the anchor word, a word having the high specialty, specificity, or category independence from words included in the supplementary text.

9. A method comprising:
   dividing a sentence included in a target document serving as classification target into word units;
   dividing a sentence included in a supplementary text indicating a feature of a classification item into word units;
   calculating an appearance statistic of a word obtained from the target document and the supplementary text, the appearance statistic representing a statistic of an occurrence the word;
   providing, to the word, an attribute representing at least one feature of specialty, specificity, and category independence based on the appearance statistic;
   extracting an anchor word from words included in the supplementary text based on the attribute;
   performing target learning in accordance with an attribute of the anchor word and generating a word embedding vector; and
   estimating a classification category of the target document based on the word embedding vector.

10. A non-transitory computer-readable storage medium storing a program for causing a computer to execute:
   a function of dividing a sentence included in a target document serving as classification target into word units;
   a function of dividing a sentence included in a supplementary text indicating a feature of a classification item into word units;
   a function of calculating an appearance statistic of a word obtained from the target document and the supplementary text, the appearance statistic representing a statistic of an occurrence of the word;
   a function of providing, to the word, an attribute representing at least one feature of specialty, specificity, and category independence based on the appearance statistic;
   a function of extracting an anchor word from words included in the supplementary text based on the attribute;
   a function of performing target learning in accordance with an attribute of the anchor word and generating a word embedding vector; and
   a function of estimating a classification category of the target document based on the word embedding vector.

* * * * *